United States Patent
Wightman et al.

[11] Patent Number: 6,161,087
[45] Date of Patent: Dec. 12, 2000

[54] SPEECH-RECOGNITION-ASSISTED SELECTIVE SUPPRESSION OF SILENT AND FILLED SPEECH PAUSES DURING PLAYBACK OF AN AUDIO RECORDING

[75] Inventors: Colin W. Wightman; Joan Bachenko, both of St. Peter, Minn.

[73] Assignee: Lernout & Hauspie Speech Products N.V., Ypres, Belgium

[21] Appl. No.: 09/166,364

[22] Filed: Oct. 5, 1998

[51] Int. Cl.[7] .............................. G10L 11/02; G10L 15/00; G10L 21/00

[52] U.S. Cl. .......................... 704/215; 704/233; 704/251; 704/278

[58] Field of Search ..................... 704/215, 233, 704/251, 278

[56] References Cited

U.S. PATENT DOCUMENTS

| | | | |
|---|---|---|---|
| 3,987,484 | 10/1976 | Bosche et al. | 386/69 |
| 4,376,874 | 3/1983 | Karban et al. | 704/215 |
| 4,696,039 | 9/1987 | Doddington | 704/215 |
| 4,701,937 | 10/1987 | Wan et al. | 375/242 |
| 4,774,600 | 9/1988 | Baumeister | 386/55 |
| 4,916,742 | 4/1990 | Kolesnikov et al. | 704/215 |
| 5,448,679 | 9/1995 | McKiel, Jr. | 704/208 |
| 6,049,765 | 4/2000 | Iyengar et al. | 704/201 |

*Primary Examiner*—David R. Hudspeth
*Assistant Examiner*—Tālivaldis Ivars Šmits
*Attorney, Agent, or Firm*—Bromberg & Sunstein LLP

[57] ABSTRACT

A method for playback of speech in an audio recording. The method comprises performing full word-level recognition of the speech including recognition of silent pauses and filled pauses, suppressing playback of the filled pauses and silent pauses, alerting a listener of the audio recording to locations of suppressed filled pauses and silent pauses during playback of the audio recording, and accepting a user command to disable suppression of any filled pause or silent pause during playback of the audio recording.

20 Claims, 4 Drawing Sheets

SPEECH-RECOGNITION-ASSISTED SELECTIVE SUPPRESSION OF SILENT AND FILLED SPEECH PAUSES DURING PLAYBACK OF AN AUDIO RECORDING

BACKGROUND OF THE INVENTION

1. Field of the Invention

This invention relates to the playback of speech recordings. More particularly, this invention relates to computerized methods and systems for suppressing pauses during the playback of audio recordings for transcription. The methods and systems are implemented in computer hardware and software, and in speech playback equipment controlled by computer hardware and software. This invention is related to a co-pending application, filed on even date herewith, entitled "A Method and System for Performing Text Edits During Audio Recording Playback."

2. Background Information

Dictation and transcription of recorded speech is commonly used in a variety of professions, such as in the legal and medical fields. Transcription is typically done by human transcriptionists who listen to an audio recording of a dictation and type the recorded speech into a word processor. The playback of the audio recording is typically controlled by a foot pedal which allows the transcriptionist to start or stop the advance or the "rewind" of recorded speech without having to remove his or her hands from the keyboard. If the audio recording contains a large number of pauses, however, the productivity of the transcriptionist decreases, because he or she must wait through the pauses to be able to hear and identify the resumption of the dictation.

Pauses may be of two varieties: silent pauses or filled pauses. Throughout this specification the term "silent pauses" will be used to refer to pauses during the dictation with no speech whatsoever. Silent pauses may occur for a variety of reasons. The speaker, for example, may pause to think or may be interrupted while recording speech. The term "filled pause" will be used to refer to pauses during the dictation that the speaker fills with "words" such as "um" or "ah" that have no meaning for purposes of transcription. Both silent pauses and filled pauses in speech decrease the productivity of the transcriptionist by forcing that person to wait through the pauses for the resumption of transcribable speech.

Speech recognition systems are available that are capable of performing full word-level recognition of speech. Some of the available speech recognition systems are usable for transcription because they are capable of outputting spoken words as text that may be edited using typical word processing software. If a speech recognition system could perform perfect transcription, the output text would need little or no editing to appear as accurate transcribed text. However, even if the speech recognition system were nearly flawless, speech that is not meant to be part of the transcribed text, such as punctuation, paragraph markers, corrections or other instructions for a transcriptionist and phonemic transcriptions of filled pause sounds, may appear as the text output of the speech recognition system. Background speech, such as a conversation between the dictator and another person that is not meant to be recorded, may also become part of the transcribed speech. Therefore, even if a speech recognition system were nearly flawless, there will typically be problems with the transcribed text output.

Speech recognition systems may also have trouble producing quality results if a speaker has a strong accent or speaks with poor grammar. In many situations, therefore, a transcriptionist is needed to edit the text resulting from a speech recognition system to produce quality transcribed text. Such editing may require replay of all or portions of the original recording. In many of the "hard cases" where the speaker speaks poorly or there is a lot of background speech or noise in the recording, it may be easier for a transcriptionist to transcribe the recorded speech completely from scratch and without the aid of a "first draft" by a speech recognition system.

A method and system is needed to allow a transcriptionist to control the playback of speech so that silent and filled pauses will not substantially decrease the productivity of the transcriptionist by forcing that person to wait through the pauses before resuming transcription or editing of the dictation.

SUMMARY OF THE INVENTION

One embodiment of the invention may be a method for playback of speech in an audio recording. The method comprises performing full word-level recognition of the speech including recognition of silent pauses and filled pauses, suppressing playback of one or more filled pauses and silent pauses, alerting a listener of the audio recording to locations of suppressed filled pauses and silent pauses during playback of the audio recording, and allowing a user to disable suppression of one or more filled pauses or silent pauses during playback of the audio recording. This embodiment may also comprise identifying pauses that are of greater length than a minimum pause period and suppressing playback of only each so-identified longer pause period, and the act of performing recognition may further comprise adjusting both a start time and a stop time of each identified pause by a guard period to decrease the length of the suppressed pause.

Another embodiment of the invention may comprise performing full word-level recognition of the speech including recognition of filled pauses, wherein the act of performing recognition includes treating recognized filled pauses as actual filled pauses only if a pattern of occurrence of the recognized filled pauses matches with a pattern of occurrence of filled pauses in speech, and suppressing playback of one or more actual filled pauses and silent pauses.

Yet another embodiment of the invention may be an apparatus for playback of speech in an audio recording. In this embodiment, the apparatus may comprise a speech recognizer to perform full word-level recognition including recognition of silent pauses and filled pauses, software containing instructions to suppress playback of one or more silent pauses and filled pauses, and a user interface to alert a listener of the audio recording to locations of suppressed filled pauses and silent pauses during playback of the audio recording and to permit disabling suppression of one or more filled pauses or silent pauses during playback of the audio recording. In another embodiment, the software of the apparatus may further contain instructions to identify pauses that are of greater length than a minimum pause period and to suppress playback of only these identified pauses. In yet another embodiment, the software of the invention may further contain instructions to adjust both a start time and a stop time of each identified pause by a guard period to decrease the length of each identified pause.

DETAILED DESCRIPTION

The accompanying Figures depict embodiments of the speech playback system and methods of the present invention, and features and components thereof. With regard to references in this specification to computers, the computers may be any standard computer including standard attachments and components thereof (e.g., a disk drive, hard drive, CD player or network server that communicates with a CPU and main memory, a keyboard and mouse, and a monitor). The microprocessor of the CPU in the computer may be any conventional general purpose single- or multi-chip microprocessor such as a Pentium® processor, a Pentium® Pro processor, a 8051 processor, a MIPS® processor, a Power PC® processor, or an ALPHA® processor. In addition, the microprocessor may be any conventional special purpose microprocessor such as a digital signal processor or a graphics processor. The microprocessor has conventional address lines, conventional data lines, and one or more conventional control lines. With regard to references to software, the software may be standard software used by those skilled in the art or may be coded in any standard programming language to accomplish the tasks detailed below.

a. General Overview

Figure 1:
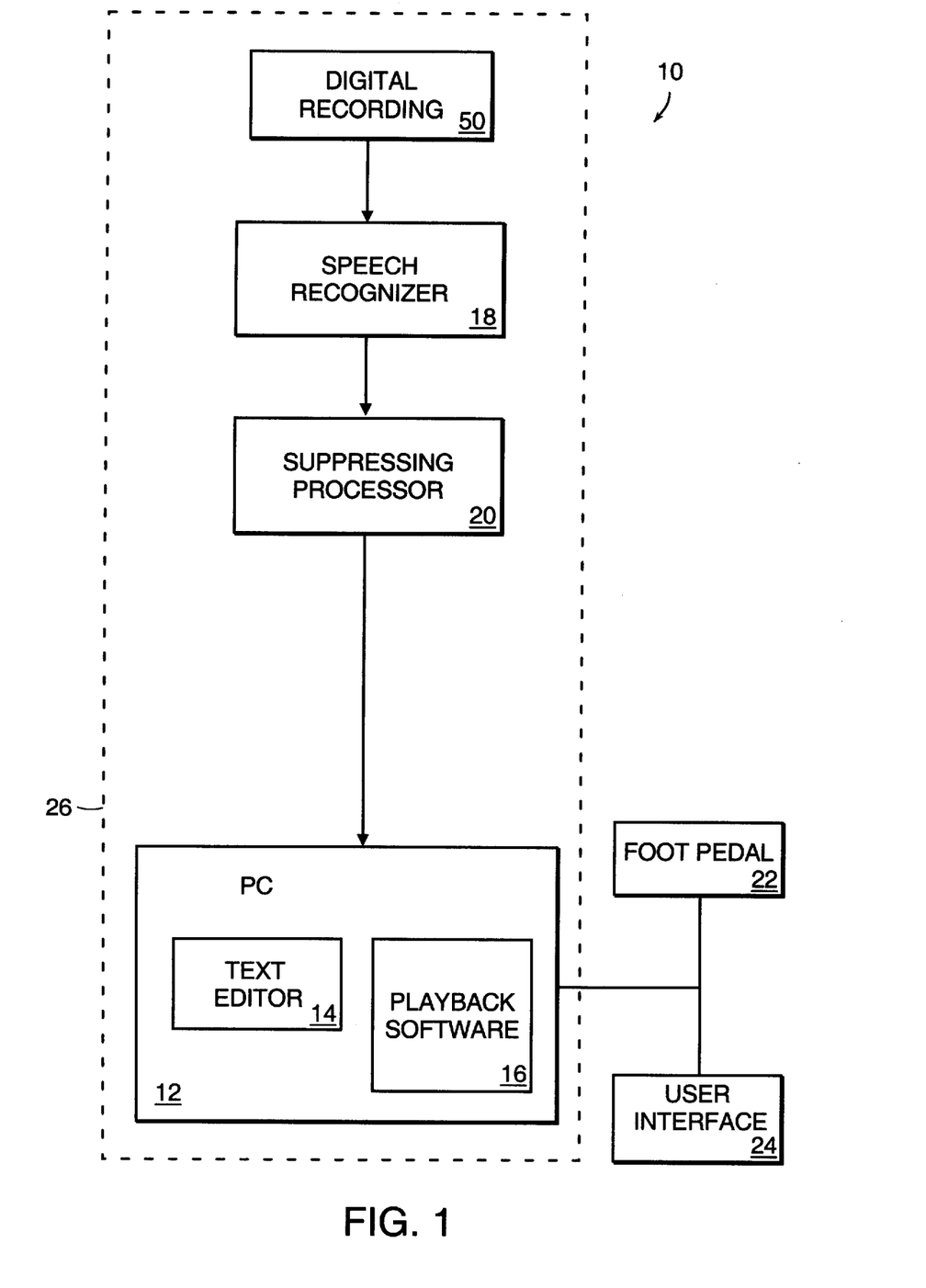
FIG. 1 is a block diagram overview of the speech playback system.

The speech playback system 10 of the present invention is shown in a general block-diagram form in FIG. 1. As shown in FIG. 1, the speech playback system 10 generally comprises at least one computer 12 with a text editor 14 and speech playback software 16, a speech recognizer 18, a suppressing processor 20, a foot pedal 22 for controlling the playback of speech, and a user interface 24. As shown by the phantom line in FIG. 1, the computer 12, speech recognizer 18, and suppressing processor 20 may all be contained within one computer or computer system, which is represented by numeral 26 in FIG. 1. In another embodiment, the speech recognizer 18 and suppressing processor 20 may be on a separate computer or computer system from the computer 12. Although the speech recognizer 18, suppressing processor 20, and playback software 16 are separately listed in FIG. 1, these components may all be contained within one module or suite of modules or objects. For example, in one embodiment the speech recognizer 18 and suppressing processor 20 may be embodied or interwoven within the playback software 16. Throughout this specification, therefore, the speech recognizer 18, suppressing processor 20, and playback software 16 will be referred to separately, although the instructions for performing the functions of the speech recognizer 18, suppressing processor 20, and playback software 16 may all be combined into one program or software suite.

In operation, the speech playback system 10 in general suppresses the segments of recorded speech that are silent or filled pauses, so that the transcriptionist can save time during playback for transcription of the recorded speech or editing of the written text. Throughout this specification, the term "suppress" will be used to refer to the act of skipping over or removing segments of a digital recording during playback. The speech recognizer 18 receives a digitized recording of speech and performs full word-level recognition of the speech, including recognition of filled pause "words," such as "um" or "ah." The output from the speech recognizer 18 is then fed to the suppressing processor 20, which analyzes the output file and marks for suppression one or more silent pauses and filled pauses. The suppressing processor 20 may also only mark for suppression those silent or filled pauses that are of a minimum length, and may adjust the length of the suppressed pauses by a guard period so that abrupt cut-off or resumption of the speech will be less likely. During playback of the recorded speech, the playback software 16 identifies the locations where a filled pause has been marked for suppression by the suppressing processor 20 and skips over that segment of the recording. The transcriptionist, therefore, does not have to wait through filled pauses to resume transcription of the speech or editing of the written text. When a suppressed filled pause is not played back by the software, a user interface 24 provides a visual or audio signal to alert the transcriptionist to the suppression. This permits the transcriptionist, if desired, to rewind, disable the suppression and hear the recording without the suppression, to determine whether the suppressed portion has useful speech information.

As generally described above, the speech recognizer 18 may provide adequate text output to allow editing by a transcriptionist or may require a transcriptionist to transcribe the recorded speech. The invention is particularly useful, however, for those dictations for which full word-level recognition is inaccurate because of, for example, poor grammar or a heavy accent. Although the dictation may still require full transcription or heavy editing by a person, the transcriptionist can save time during transcription or editing by skipping over silent and filled pauses during playback of the recording and replaying skipped material only when necessary.

b. The Speech Recognizer

Figure 2:
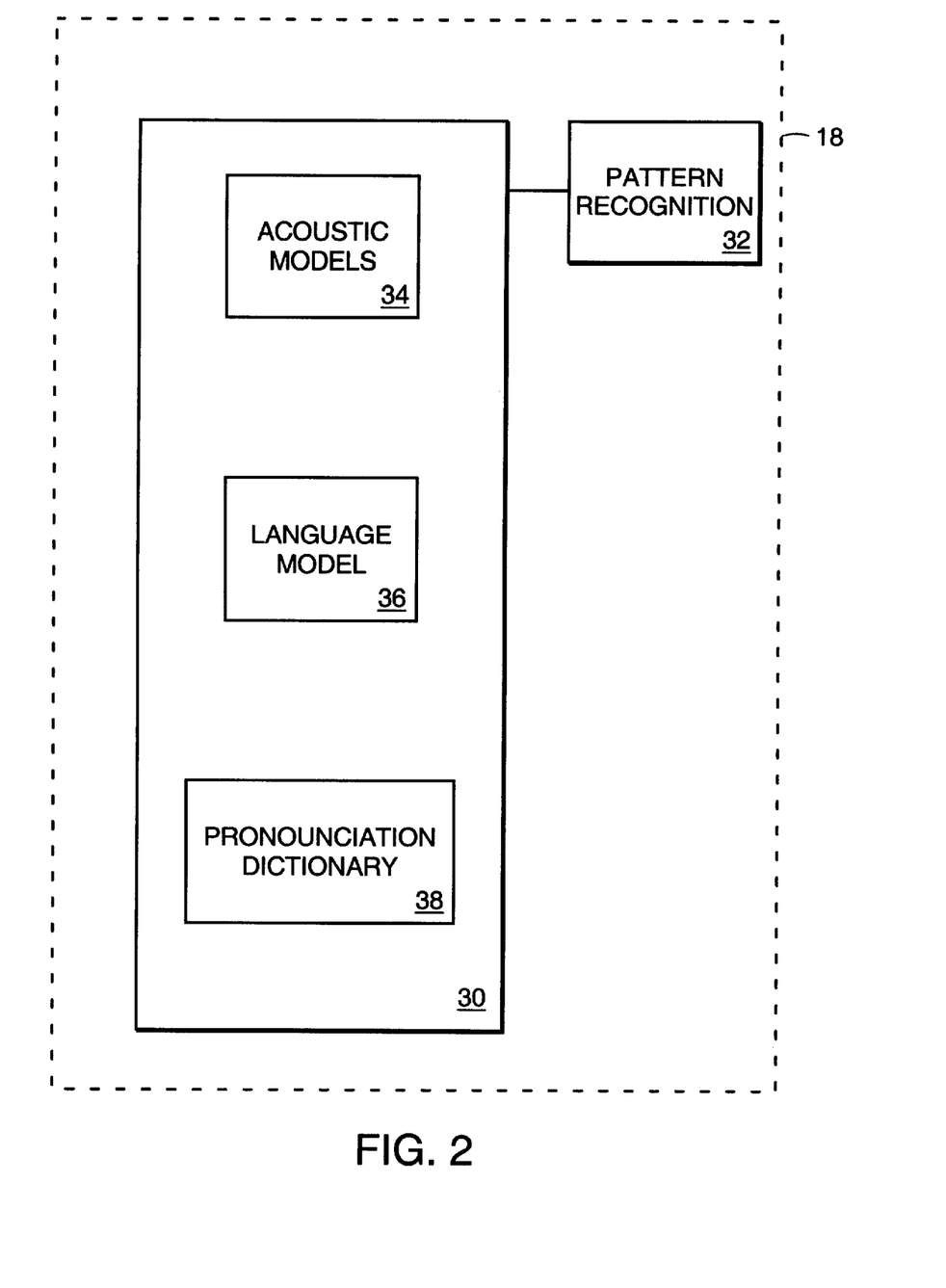
FIG. 2 is a block diagram showing further details of the speech recognizer block of FIG. 1.

FIG. 2 shows the speech recognizer 18 of FIG. 1 in greater detail. In one embodiment, the speech recognizer 18 uses a digital recording 50 of speech as an input. In the speech playback system 10 of the invention, the digital recording 50 may be made from analog sound received directly over the telephone line. This may be a live, real time dictation to the system 10. Alternatively, a user who wishes to have an audio recording transcribed may simply play the audio recording over the telephone and a digital recording 50 of the audio recording may be made at the receiving end for input into the speech recognizer 18. In one embodiment, the digital recording 50 may be a mu-law encoded 8-bit audio digital signal.

A high quality commercial speech recognizer 18 may be used in the invention. One such commercial speech recognizer 18 is the Truetalk product developed by Entropic Inc. This speech recognizer 18, which runs on a computer 12, in general comprises an experience base 30 and pattern recognition code 32 to drive the speech recognizer 18. The experience base 30 contains important components of the speech recognizer 18. As shown in FIG. 2, the Truetalk speech recognizer 18 contains three inter-connected modules within the experience base 30: a set of acoustic models 34, a language model 36, and a pronunciation dictionary 38. The three modules function together to recognize words in spoken speech. Although the speech recognizer 18 described herein will be described with reference to the English language, the modules may be adapted to perform word recognition for other languages.

The acoustic models 34 of the speech recognizer 18 may contain a set of models of sounds (sometimes called phonemes). Each sound used in common speech may therefore be represented by a model within the acoustic models 34. For instance, the sounds "k," "ae" and "t" (which together form the word "cat") may be represented within the acoustic models 34.

The pronunciation dictionary 38 may be a set of models that is capable of combining the sounds within the acoustic models 34 to form words. For example, the pronunciation dictionary 38 may include combining the "k," "ae" and "t" sounds from the acoustic models 34 to form the word "cat."

The language model 36 may aid in determining the occurrence of words by applying known patterns of occurrences of words within speech. For instance, if the pronunciation dictionary 38 is unable to determine with adequate certainty what words certain speech contains, the language model 36 may be able to determine the words from the context or from patterns of occurrence of certain words in spoken language. A large number of words (typically more than 10 million) may be used to train the language model 36. The language model 36 may be person-specific or specific to certain contexts, such as the medical field. If the language model 36 is limited by person or context, the language model 36 may require less training to determine patterns of occurrence of words in speech. The language model 36, however, need not be person or context specific. The language model 36 may contain statistical models that represent the probability that certain words will occur within certain patterns of speech.

Commercial speech recognizers 18 in general come with generic versions of the experience base. Some of these speech recognizers 18, such as the Truetalk product by Entropic, Inc., allow the user to modify and add to the models. For instance, in one embodiment of the speech playback system 10 of the present invention, filled pause "words" are represented within the models and treated much like other transcribable words. This will allow the speech recognizer 18 to recognize and process filled pauses like any other word. An adequate set of sounds for filled pause "words" is typically not found within the generic acoustic models 34; thus, the acoustic models 34 must be augmented with models for filled pause sounds that are as sophisticated as for other words. The pronunciation dictionary 38 may also need to be modified to recognize these filled pauses as words. Similarly, the language model 36 may be modified so that filled pause "words" are presented in the data used to train the language model 36 and so that patterns of occurrence are modeled for these "words." Additionally, the models may be modified for a specific context, such as medical speech, or for specific users with different accents or grammatical patterns. The significant point is that the experience base 30 used in the present system is configured so that filled pause "words" are recognizable by recognizer 18 with an accuracy comparable to other words.

Figure 3:
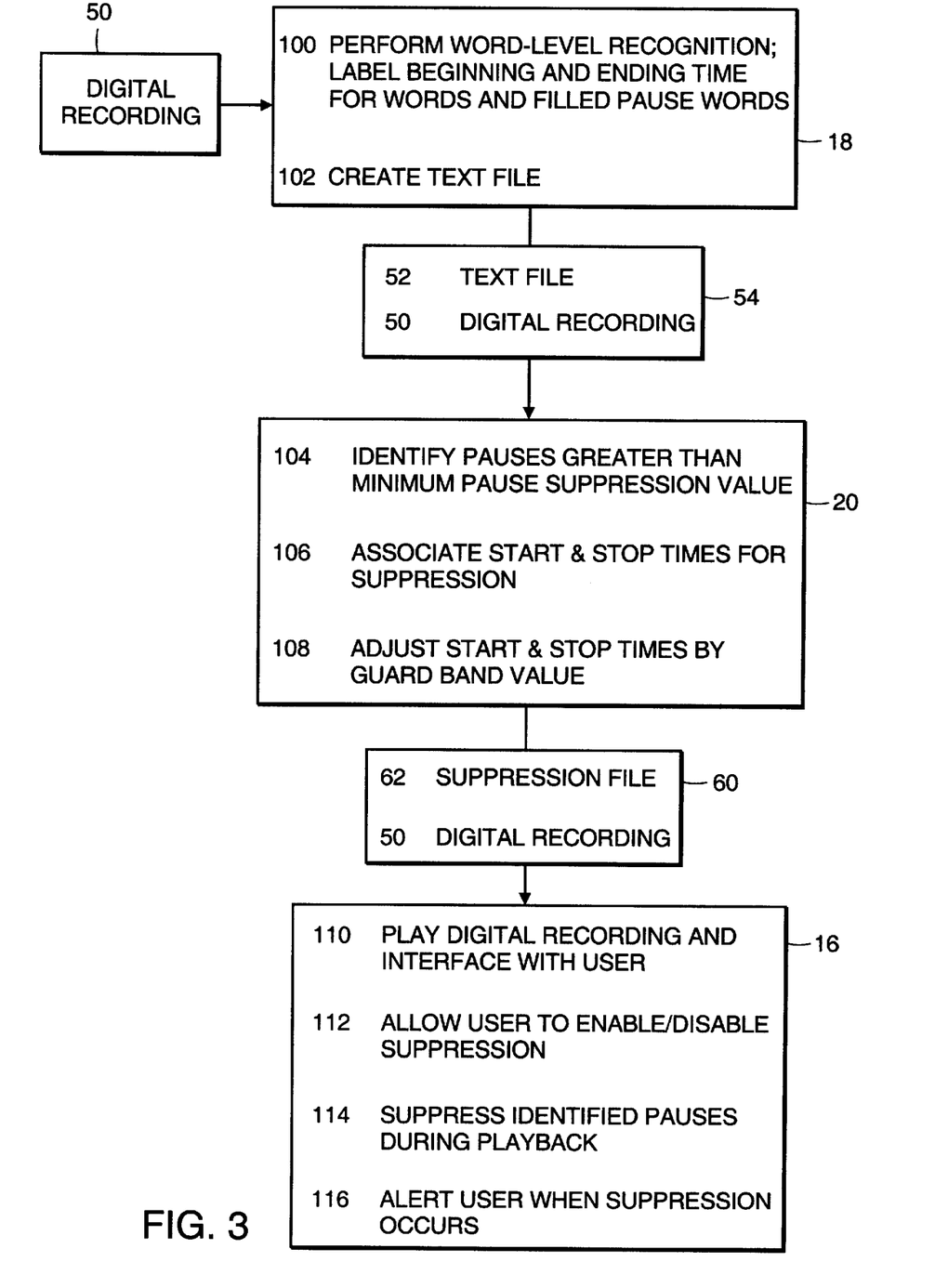
FIG. 3 is a flow chart showing the operation of the speech playback system.

As illustrated in the flow chart of FIG. 3, the speech recognizer 18 may take a digital recording 50 of speech as an input. In the embodiment of FIG. 3, the speech recognizer 18 performs full word-level recognition of the digital recording 50, including recognition of filled pause "words." The speech recognizer 18 then may create a text file 52 of the words in the digital recording 50. The text file 52 contains not only the characters forming the recognized words but a beginning and ending time for each word and each silent pause in the recorded speech, including filled pause "words." The digital recording 50 and text file 52 together form the output from the speech recognizer 18, which will be referred to throughout this specification as the recognizer output file 54.

As noted above, with a particularly clean input digital recording 50, the recognizer output file 54 can be used to produce a first draft transcription. However, when human intervention is needed to produce an acceptable transcription, the recognizer output file 54 is further processed for more efficient playback.

c. The Suppressing Processor

The recognizer output file 54 from the speech recognizer 18 becomes the input to the suppressing processor 20, as illustrated in the embodiment of FIG. 3. The suppressing processor 20 may be software designed to mark for suppression appropriate filled pauses and silent pauses. These marks may later be used to suppress playback of the appropriate filled pauses and silent pauses. The output from the suppressing processor 20, which will be referred to throughout this specification as the LIX file 60, is a massaged version of the recognizer output file 54. The LIX file 60 may contain the original digital recording 50 along with a suppression file 62. The suppression file 62 in the LIX file 60 may contain suppression indicators and numbers inserted in the text file 52 that represent the start and stop times of speech suppression during playback of the speech. The numbers representing the start and stop times of suppression correspond to the time locations in the digital audio recording 50 in the LIX file 60 where a specific suppressed sound occurs.

A flow chart of the operation of the suppressing processor 20 is shown as a portion of FIG. 3. The suppressing processor 20 may treat all filled pauses as if they are silent pauses; in other words, filled pauses may be treated as if they were not even spoken.

After filled or silent pauses are marked as identified pauses for suppression, the text file 52 may be labeled with a start time and stop time for each identified pause so that the identified pauses may be suppressed during playback. The transcriptionist may also need some pauses between spoken words to be able to recognize that separate words are being spoken. In this embodiment, therefore, the start and stop times for each identified pause are adjusted to decrease the total length of the identified pause for suppression. In one embodiment, the guard period may be ¼ of a second, although this guard period may also vary. If the guard period is ¼ of a second, the start and stop times will each be adjusted by ¼ second so that the total adjustment to the duration of the identified pause period is ½ second.

Figure 4A:
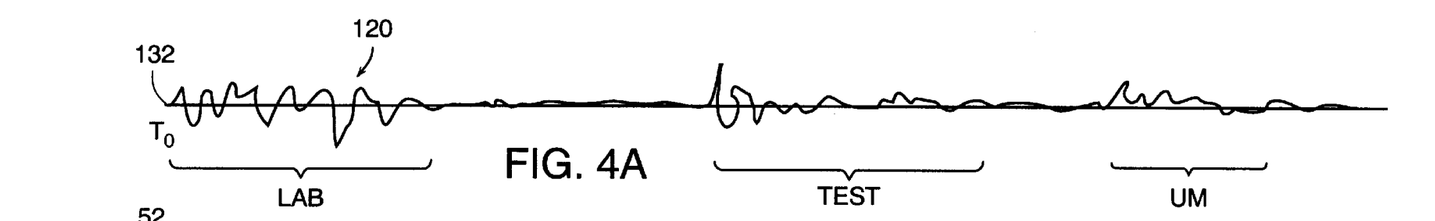
FIGS. 4a–4d are diagrams detailing the function of the suppressing processor, including adjusting of pause length in the speech playback system.
Figure 4B:
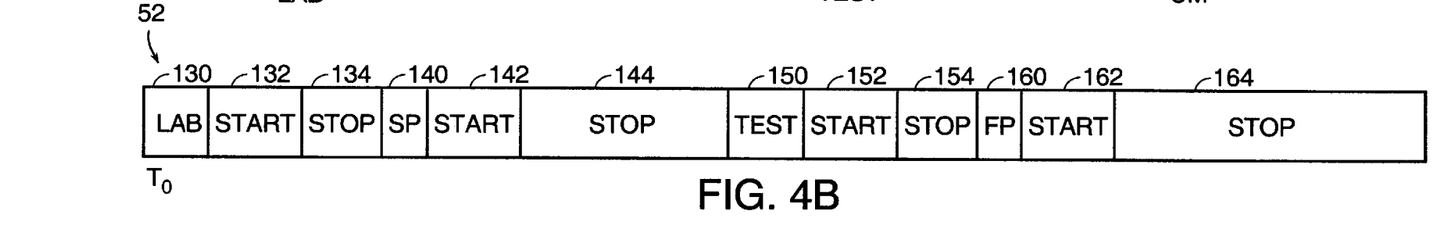

FIGS. 4a–4d show in schematic form the operations performed in the suppressing processor 20 and recognizer 18. FIG. 4a shows a waveform 120 in real time representing the sounds of "lab test um", which might be uttered by a speaker in dictation, starting at a time T0 132. As can be seen, there are pauses between each of the three words. FIG. 4b, which is not configured in real time, shows how the text file 52 produced by recognizer 18 might appear after the recognizer processes the portion of a digital recording 50 corresponding to the waveform 120.

As can be seen in FIG. 4b, the word "lab" is correctly recognized and transcribed. A start time 132 and a stop time 134 relative to T0 or some other time base is associated with the text characters "1-a-b" 130. Following "lab," the recognizer 18 finds a silent pause, identified by code SP in data field 140. A start time 142 and a stop time 144 relative to T0 or some other time base is also associated with the silent pause. Next the text for "test" produced by recognizer 18 is shown; again a start time 152 and a stop time 154 relative to T0 or some other time base is associated with the text characters "t-e-s-t" 150. Following "t-e-s-t" the recognizer 18 identifies a filled pause, "um", identified by FP in field 160, with some silence both preceding and following. This filled pause and silence surrounding it may be merged to create one filled pause, with a corresponding start time 162 and a stop time 164, so that the entire segment may be suppressed. Thus, if a silent pause precedes the filled pause or follows the filled pause, it may simply be made part of the filled pause. This permits the entire sequence to be suppressed as a unit.

Figure 4C:
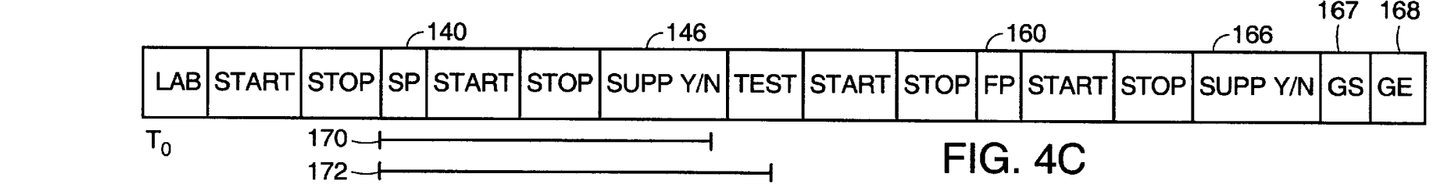

FIG. 4c, which, like FIG. 4b, is not configured in real time, shows how the data of FIG. 4b appear following processing by the suppressing processor 20. The data for recognized normal words "lab" and "test" remain unchanged. However, suppressing processor 20 appends a field 146 to the data for the silent pause 140, which indicates it is to be suppressed. If desired, this field may be defined as one that is toggled (Y/N) between a state indicating suppression and one indicating no suppression.

Suppressing processor 20 also appends to the filled pause 160 a field 166 which A indicates it is to be suppressed. This field may also be defined as one that is toggled (Y/N) between a state indicating suppression and one indicating no suppression. To help avoid the need to playback the filled pause, a guard band technique may be used. To do this, a short time period may be deleted from the start and the end of the filled pause that would otherwise be suppressed. The deleted time segments are added to the words proceeding or following the pauses. The guard band can be a user-selected variable parameter. The guard band period can be different for the start of the filled pause than for the end of the filled pause or the two guard band periods may be equal. Fields 167 and 168 may be appended to the filled pause data 160 to define the two guard bands. In use, the starting guard band value (GS) 167 will be added to the start time of the filled pause to shorten the total duration of the filled pause and the ending guard band value (GE) 168 will be subtracted from the stop time for the filled pause to further shorten its duration. Use of the guard band values helps to avoid abrupt cut-off of speech preceding the filled pause and abrupt start-up of speech following the filled pause. This may assist the transcriptionist in understanding the speech surrounding the filled pause. As an option, the guard band approach may also be used for silent pauses, either in conjunction with use of the guard band with filled pauses or independently.

To further avoid abrupt interruptions caused by the suppression of silent pauses or filled pauses, the suppressing processor 18 may have a further user-selected variable parameter, a minimum pause suppression value. This minimum value is applied as a threshold so that a silent pause or a filled pause will be marked for suppression only if its duration exceeds the minimum pause suppression value. The minimum pause suppression value may be the same or different for silent pauses and filled pauses. For example, it may be 2 seconds; thus, the second pause between words during spoken speech which is typically a few hundred milliseconds will not be suppressed.

As can be seen in FIG. 4c, when the minimum pause suppression value is the same for both silent pauses and filled pauses, a minimum pause suppression value 170 that is less than the duration of silent pause 140 will not cause either silent pause 140 or filled pause 160 to be suppressed. On the other hand, if the minimum pause suppression value 172 is just slightly greater than the duration of silent pause 140, it will cause silent pause 140 not to be suppressed but filled pause 160 (which is much longer) will be suppressed. As a further option, the minimum pause suppression value 172 can be applied to the duration of a filled pause or silent pause either with or without the use of the guard band values to reduce duration.

In an alternative embodiment, the suppressing processor 20 may only label for suppression pauses that are greater than the minimum pause suppression value. In this embodiment, if a pause is of shorter length than the minimum pause suppression value, the start and stop times of the adjacent words may be altered so that there is no pause between the words. In other words, the stop time of the earlier word will be extended and the start time of the later word will be made earlier so that no silent pause will be labeled between the words. During playback, therefore, no pause will occur or will even be labeled between the words. In this embodiment, all pauses labeled by the suppressing processor 20 may be suppressed during playback.

Figure 4D:
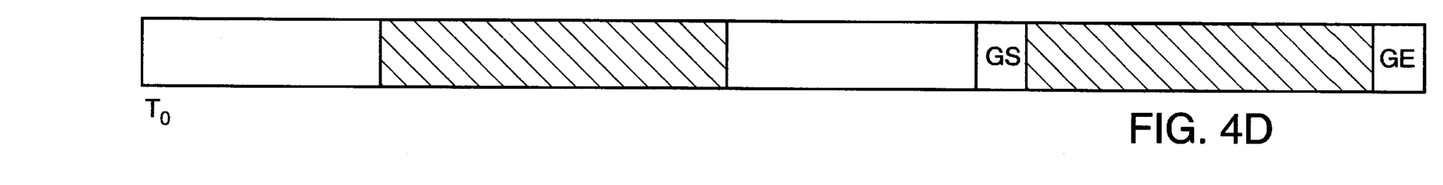

FIG. 4d, which is configured in real time, shows by crosshatching the suppressed portions of the waveform 120 when the minimum pause suppression value 170 is used and guard bands GS, GE are applied to shorten the duration of filled pause 160.

The output from the suppressing processor 20, called the LIX file 60, may therefore contain the original digital recording 50 along with a suppression file 62, which may contain the start and stop times for suppression of speech during playback of the digital recording 50.

d. Playback Software

The output from the suppressing processor 20, the LIX file 60, may be used by the playback software 16 during playback of the speech. The transcriptionist typically will use a standard text editor 14, such as Microsoft Word for Windows® or Corel WordPerfect®, to transcribe recorded speech during playback of the speech recording. The playback software 16 is generally needed to play the audio digital recording 50, interpret the suppression file 62 and suppress the identified pauses during playback of the speech. The playback software 16 also has a user interface to alert the user to suppressed segments of the speech, to accept commands from a user to enable or disable user-selectable suppression and to interface with the foot pedal 22 to allow the transcriptionist to control the playback of speech.

The playback software 16 may be any variety of software usable on the computer 12, and may contain a graphical user interface to allow the user to access LIX files 60 to begin a transcription session. In one embodiment, when a transcriptionist is ready to begin transcribing a recording, the graphical user interface 16 may allow the user to select a LIX file 60. After the LIX file 60 is selected, the transcription session may begin with the playback of the digital recording 50. The graphical user interface may also contain a toggle switch to allow the transcriptionist to enable or disable suppression of one or more silent or filled pauses during the playback of the speech. In some situations, for example, the transcriptionist may find it easier to transcribe speech with some or all of the suppression of pauses disabled. If the transcriptionist hears something which causes him or her to suspect that legitimate speech was suppressed in error or that additional contextual sounds would aid interpretation, the transcriptionist may want to disable suppression so that the full original sound is played.

The playback software 16 may contain instructions to allow it to interpret the start and stop times in the suppression file 62 to suppress the identified pauses during playback of the speech. In one embodiment, the playback software 16 may utilize the start and stop times from the suppression file 62 to identify the corresponding locations in the digital recording 50, such that the playback of speech from the digital recording 50 can be suppressed during the identified pauses marked by the start and stop times in the suppression file 62.

In another embodiment, the playback software 16 interfaces with a standard foot pedal 22 to allow the transcriptionist to control the playback of speech. The playback software 16, for example, may contain instructions which can interpret signals from the foot pedal 22 to fast forward or rewind so that the transcriptionist may hear different areas of the digital recording 50. In another embodiment, the playback software 16 may contain instructions allowing it to interpret signals from the keyboard, the mouse or foot pedal to enable or disable suppression of pauses during playback of the speech. The playback software 16 may also allow the transcriptionist to start or stop a transcription session, or to begin or stop playback of a digital recording 50.

In yet another embodiment, the user interface 24 alerts the user when speech is suppressed during the playback of the digital recording 50. The user interface 24 may be a module of the playback software 16, or it may be a separate module that interfaces with the playback software 16. In one embodiment, the user interface 24 may be a light or other visual signal (e.g., a flashing icon on a monitor) that indicates when speech is suppressed during playback. For instance, a light could turn on when speech is suppressed during playback or a message could be displayed indicating suppression and, optionally, the duration of the suppression. In an embodiment where the speech recognizer 18 outputs text of high enough quality to allow editing of the text, a visual symbol (such as brackets) may appear in the text for pauses that will be suppressed during playback. The user interface 24 may also include controls to allow the transcriptionist to set the attributes of the signal indicating suppression (e.g. volume, pitch, brightness, or form of the signal). This visual signal may aid the transcriptionist to stop the playback of the digital recording 50 or to disable suppression to hear the speech as it was recorded without suppressed pauses.

In another embodiment, the user interface 24 could use an audio signal (e.g., a beep) that alerts the user to suppression of speech. The playback software 16, for instance, may contain instructions to create a sound whenever speech is suppressed during playback. Thus, during normal playback, the transcriptionist may hear the dictation without filled or silent pauses and may see and/or hear suppression signals whenever a pause has been suppressed. The transcriptionist may then know when speech has been suppressed and may replay the suppressed segment or disable suppression, if needed.

The user interface 29 may also provide access for adjustment of user selectable parameters, such as the minimum pause suppression value 170 or the guard band values.

e. Operation of the Speech Playback System

FIG. 3 illustrates the operation of the speech playback system 10 in flow chart form. In operation, the speech recognizer 18 receives a recording of speech. The speech recognizer 18 performs full word-level recognition of the speech, including recognition of filled pauses, and labels beginning and ending times of words at step 100. At step 102, the speech recognizer 18 may create a text file 52 of the speech and, along with the original digital recording 50, forms a recognizer output file 54 as an output from the speech recognizer 18.

The recognizer output file 54 may then be fed to the suppressing processor 20. At step 104, the suppressing processor 20 identifies filled pauses and silent pauses, and the suppressing processor 20 may select those filled and silent pauses that are greater in length than a minimum pause suppression value 170 or 172. At step 106, the suppressing processor 20 may label a start and stop time for the identified pauses, which are greater in length than the minimum pause suppression value. At step 108, the suppressing processor 20 may adjust the start and stop times for the identified pauses by a guard period GS, GE, so that useful trailing or leading sounds are not cutoff during the playback of speech.

The output from the suppressing processor 20, the LIX file 60, is then forwarded to the computer 12, where the transcriptionist plays the audio recording back during transcription of the recorded speech. At step 110, the playback software 16 may allow the user to interface with the LIX files 60 to select and play digital recordings. The playback software 16 may also interpret the suppression file 62 and suppress playback of identified pauses 70 during playback of the digital recording 50. In this embodiment, shown as step 114, during playback of the recorded speech, the playback software 16 notes the time locations where speech has been suppressed by the suppressing processor 20 and skips over (or suppresses) that segment of the recording during playback. The playback software 16 may accept from the transcriptionist commands to enable or disable suppression of speech during playback, as represented by step 112. At step 116, when suppressed speech is not played back by the software, the user interface 24 provides a visual or audio signal to alert the transcriptionist to the suppression. The transcriptionist may then control the playback of speech with the foot pedal 22 (shown in FIG. 1) and choose commands to disable or enable suppression as needed.

In one embodiment of the invention, steps 100 through 108 may all be performed offline and automatically without requiring the transcriptionist to wait for these acts to be performed. The transcriptionist, therefore, may simply select a LIX file 60 and begin to transcribe recorded speech when the transcriptionist desires. In this embodiment, the speech playback system 10 may automatically perform steps 100 through 108 upon the receipt of a digital recording 50 for transcription.

With use of the present system for handling and suppression of silent and/or filled pauses, a transcriptionist has less idle time waiting for transcribable sounds. It has been found with typical dictation of the kind requiring manual transcriptions that the efficiency of transcription (measured by time to completion) can be increased 20% to 50%.

While the present invention has been described with reference to several embodiments thereof, those skilled in the art will recognize various changes that may be made without departing from the spirit and scope of the claimed invention. Accordingly, this invention is not limited to what is shown in the drawings and described in the specification but only as indicated in the appended claims. Any numbering or ordering of elements in the following claims is merely for convenience and is not intended to suggest that the ordering of the elements of the claims has any particular significance other than that otherwise expressed by the language of the claims.

What is claimed is:

1. A method for playback of speech in an audio recording, the method comprising:

(a) performing full word-level recognition of the speech including recognition of one or more silent pauses or filled pauses;

(b) suppressing playback of one or more filled pauses or silent pauses;

(c) alerting a listener of the audio recording to locations of suppressed filled pauses or silent pauses during playback of the audio recording; and (d) accepting a user command to disable suppression of one or more filled pauses or silent pauses during playback of the audio recording.

2. The method of claim 1 wherein the act of alerting comprises using a visual signal.

3. The method of claim 1 wherein the act of alerting comprises using an audible signal.

4. The method of claim 1 wherein the act of performing recognition further comprises associating a start and a stop time with one or more silent pause or filled pause in the speech.

5. The method of claim 4 wherein the act of performing recognition further comprises identifying pauses that are of greater length than a minimum pause suppression value.

6. The method of claim 5 wherein the act of performing recognition further comprises adjusting both the start time and the stop time of each identified pause by a guard period to decrease the length of the identified pause, and wherein the act of suppressing comprises suppressing playback of only each identified pause.

7. A method for controlling playback of filled pauses during playback of speech in audio recordings, the method comprising:

(a) performing full word-level recognition of the speech including recognition of filled pauses, wherein the act of performing recognition includes recognizing filled pauses as actual filled pauses only if a pattern of occurrence of the recognized filled pauses matches with a pattern of occurrence of filled pauses in speech; and (b) suppressing playback of the actual filled pauses.

8. The method of claim 7 further comprising alerting a listener of the audio recording to locations of suppressed actual filled pauses during playback of the audio recording.

9. The method of claim 8 wherein the act of alerting comprises using a visual signal.

10. The method of claim 8 wherein the act of alerting comprises using an audible signal.

11. The method of claim 8 further comprising allowing a user to disable suppression of one or more actual filled pauses during playback of the audio recording.

12. The method of claim 7 wherein the act of performing recognition further comprises identifying pauses that are of greater length than a minimum pause period and adjusting both a start time and a stop time of each identified pause by a guard period to decrease the length of the identified pause prior to performing act (b).

13. The method of claim 12 wherein the act of suppressing comprises suppressing playback of only each identified pause.

14. An apparatus for playback of speech in an audio recording, the apparatus comprising:

(a) a speech recognizer to perform full word-level recognition including recognition of silent pauses and filled pauses;

(b) software containing instructions to suppress playback of silent pauses and filled pauses; and (c) a user interface to alert a listener of the audio recording to locations of suppressed filled pauses and silent pauses during playback of the audio recording and to allow a user to disable suppression of one ore more filled pauses or silent pauses during playback of the audio recording.

15. The apparatus of claim 14 wherein the user interface comprises an audible signal.

16. The apparatus of claim 14 wherein the user interface comprises a visual signal.

17. The apparatus of claim 14 wherein the software further contains instructions to treat filled pauses recognized by the speech recognizer as actual filled pauses only if a pattern of occurrence of the recognized filled pauses matches with a pattern of occurrence of filled pauses in speech, and wherein the instructions suppress playback of only actual filled pauses.

18. The apparatus of claim 14 wherein the software further contains instructions to identify pauses that are of greater length than a minimum pause suppression value, and wherein the instructions suppress playback of only the so-identified pauses.

19. The apparatus of claim 18 wherein the software further contains instructions to adjust at least one of a start time and a stop time of each identified pause by a guard period to decrease the length of each identified pause.

20. The apparatus of claim 14 further comprising a suppressing processor to identify by specified criteria and to mark pauses for suppression during playback.

* * * * *